US012585591B2

(12) United States Patent
Francis et al.

(10) Patent No.: US 12,585,591 B2
(45) Date of Patent: Mar. 24, 2026

(54) TECHNIQUE FOR PREFETCHING WITH A POINTER PREFETCHER

(71) Applicant: QUALCOMM Incorporated, San Diego, CA (US)

(72) Inventors: Sabine Francis, Austin, TX (US); Jungsoo Kim, Sawston (GB); Conrado Blasco, San Mateo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/643,530

(22) Filed: Apr. 23, 2024

(65) Prior Publication Data

US 2025/0328470 A1 Oct. 23, 2025

(51) Int. Cl.
*G06F 12/08* (2016.01)
*G06F 12/0862* (2016.01)

(52) U.S. Cl.
CPC ................................ *G06F 12/0862* (2013.01)

(58) Field of Classification Search
CPC ......... G06F 12/0862; G06F 2212/1024; G06F 2212/6024; G06F 2212/6026; G06F 2212/6028
USPC ......................................................... 711/137
See application file for complete search history.

(56) References Cited

U.S. PATENT DOCUMENTS 11,775,440 B2 10/2023 Shulyak et al.
2021/0096861 A1* 4/2021 Wang .................. G06F 9/30047

2022/0147459 A1* 5/2022 Shulyak .............. G06F 12/0862
2023/0229596 A1 7/2023 Shulyak et al.
2023/0305849 A1 9/2023 Keltcher et al.
2023/0350806 A1 11/2023 Tvila

OTHER PUBLICATIONS

Pakalapati S., et al., "Bouquet of Instruction Pointers: Instruction Pointer Classifier-based Spatial Hardware Prefetching", 2020 ACM/IEEE 47th Annual International Symposium on Computer Architecture (ISCA), May 30-Jun. 3, 2020, pp. 118-131.
International Search Report and Written Opinion—PCT/US2025/017684—ISA/EPO—Jun. 3, 2025.

* cited by examiner

*Primary Examiner* — Hua J Song
(74) *Attorney, Agent, or Firm* — Patterson + Sheridan LLP

(57) ABSTRACT

Certain aspects of the present disclosure provide techniques and apparatus for prefetching with a pointer prefetcher. Aspects include obtaining a triggering access comprising a virtual address denoting a beginning of a payload of a cache line. Aspects include determining a stride associated with the producer workload based, at least in part, on a virtual address of the producer workload. Aspects include determining a sub-cacheline trigger virtual address of the triggering access based, at least in part, on the line trigger virtual address of the triggering access, the virtual address of the producer workload, and the stride associated with the producer workload. Aspects include launching, starting at the sub-cacheline trigger virtual address of the triggering access, prefetches for data offsets within the cache line and pointed to by the stride associated with the producer workload.

18 Claims, 5 Drawing Sheets

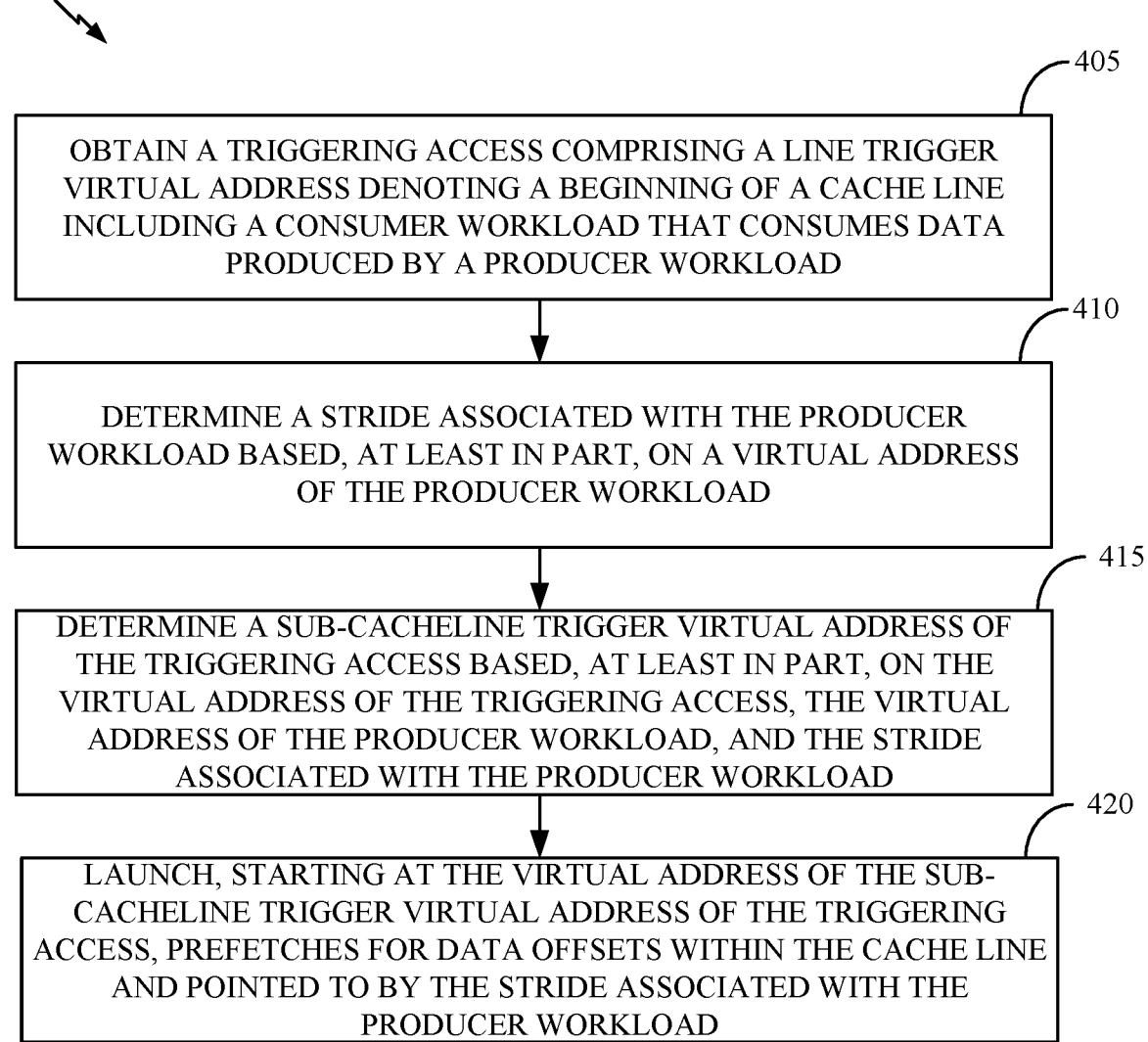

400

405

OBTAIN A TRIGGERING ACCESS COMPRISING A LINE TRIGGER VIRTUAL ADDRESS DENOTING A BEGINNING OF A CACHE LINE INCLUDING A CONSUMER WORKLOAD THAT CONSUMES DATA PRODUCED BY A PRODUCER WORKLOAD

410

DETERMINE A STRIDE ASSOCIATED WITH THE PRODUCER WORKLOAD BASED, AT LEAST IN PART, ON A VIRTUAL ADDRESS OF THE PRODUCER WORKLOAD

415

DETERMINE A SUB-CACHELINE TRIGGER VIRTUAL ADDRESS OF THE TRIGGERING ACCESS BASED, AT LEAST IN PART, ON THE VIRTUAL ADDRESS OF THE TRIGGERING ACCESS, THE VIRTUAL ADDRESS OF THE PRODUCER WORKLOAD, AND THE STRIDE ASSOCIATED WITH THE PRODUCER WORKLOAD

420

LAUNCH, STARTING AT THE VIRTUAL ADDRESS OF THE SUB-CACHELINE TRIGGER VIRTUAL ADDRESS OF THE TRIGGERING ACCESS, PREFETCHES FOR DATA OFFSETS WITHIN THE CACHE LINE AND POINTED TO BY THE STRIDE ASSOCIATED WITH THE PRODUCER WORKLOAD

502 — CPU

504 — GPU

506 — DSP

508 — NPU

510 — Multimedia

512 — Wireless Connectivity

51 — Sensor(s)

518 — ISPs

520 — Navigation

522 — Input/Output

524 — MEMORY

CACHE MEMORY
526

INSTRUCTIONS
530

MAIN MEMORY
528

INSTRUCTIONS
532

PREFETCH LOGIC
534

TECHNIQUE FOR PREFETCHING WITH A POINTER PREFETCHER

TECHNICAL FIELD

Certain aspects of the present disclosure generally relate to prefetchers and, more particularly, to techniques for prefetching with a pointer prefetcher.

BACKGROUND

A processing system includes a central processing unit (CPU), cache memory, main memory (e.g., random access memory), and a prefetcher. The prefetcher anticipates data (and/or instructions) the CPU may need from the main memory, fetches the data from the main memory, and loads the data into the cache memory. By fetching the data from the main memory before the data is needed by the CPU, the prefetcher minimizes an amount of time the CPU has to wait for data thereby improving the efficiency of the processing system.

BRIEF SUMMARY

Certain aspects provide a method for prefetching with a pointer prefetcher. The method generally includes: obtaining a triggering access comprising a line trigger virtual address denoting a beginning of a payload of a cache line including a virtual address of a consumer workload that consumes data produced by a producer workload; determining a stride associated with the producer workload based, at least in part, on a virtual address of the producer workload; determining a sub-cacheline trigger virtual address of the triggering access based, at least in part, on the virtual address of the triggering access, the virtual address of the producer workload, and the stride associated with the producer workload; and launching, starting at the sub-cacheline trigger virtual address of the triggering access, prefetches for data offsets within the cache line and pointed to by the stride associated with the producer workload.

Other aspects provide a processor comprising a pointer prefetcher configured to perform the aforementioned method as well as those described herein; and a processor comprising means for performing the aforementioned method as well as those further described herein.

The following description and the related drawings set forth in detail certain illustrative features of one or more aspects.

BRIEF DESCRIPTION OF THE DRAWINGS

The appended figures depict certain features of one or more aspects of the present disclosure and are therefore not to be considered limiting of the scope of this disclosure.

FIG. 4 depicts a method for performing prefetches using a pointer prefetcher according to various aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Aspects of the present disclosure provide apparatuses, methods, processing systems, and computer-readable mediums for prefetching with a pointer prefetcher.

Certain software applications (e.g., machine learning, graph-based, sparse linear algebra) include irregular memory accesses. These irregular memory accesses, which exhibit low temporal and spatial locality, are difficult to detect and prefetch by certain prefetchers, such as stride prefetchers. Therefore, pointer prefetchers are used to prefetch such irregular memory accesses.

Pointer prefetchers scan data read from memory to determine whether the data includes a memory address. However, pointer prefetchers cannot accurately determine whether the data includes a memory address. As a result, pointer prefetchers typically prefetch more data than necessary. These useless prefetches performed by pointer prefetchers pollute the cache memory. Furthermore, prefetches performed by pointer prefetchers are typically relatively slow (e.g., not timely). This additional latency can result in memory accesses requested by the CPU catching up to a stream of prefetches being performed by the pointer prefetcher resulting in cache misses. Cache misses can lead to diminished performance (e.g., efficiency) of the CPU as the CPU must wait for the requested memory access to be fetched by the pointer prefetcher.

Example aspects of the present disclosure are directed to techniques for improving prefetches performed by pointer prefetchers. More specifically, aspects of the present disclosure are directed to techniques for improving the accuracy and timeliness of prefetches performed by pointer prefetchers.

Disclosed techniques for improving timeliness of prefetches performed by pointer prefetchers may include performing prefetches based on prefetches performed by other prefetchers, such as stride prefetchers, that perform prefetches faster compared to pointer prefetchers. Disclosed techniques for improving timeliness of prefetches may also include determining whether a pointer prefetcher will have enough time to perform a timely prefetch by determining whether a marker indicative of a distance between a producer workload producing data and a consumer workload consuming the data exceeds a threshold.

Disclosed techniques for improving accuracy of prefetchers performed by pointer prefetchers may include implementing sub-cacheline filtering logic as discussed in more detail with reference to FIGS. 2 and 3 to more efficiently prefetch data from a payload of a cache line and thereby avoid polluting cache memory with useless prefetches.

Example Computing Environment for Prefetching

Figure 1:
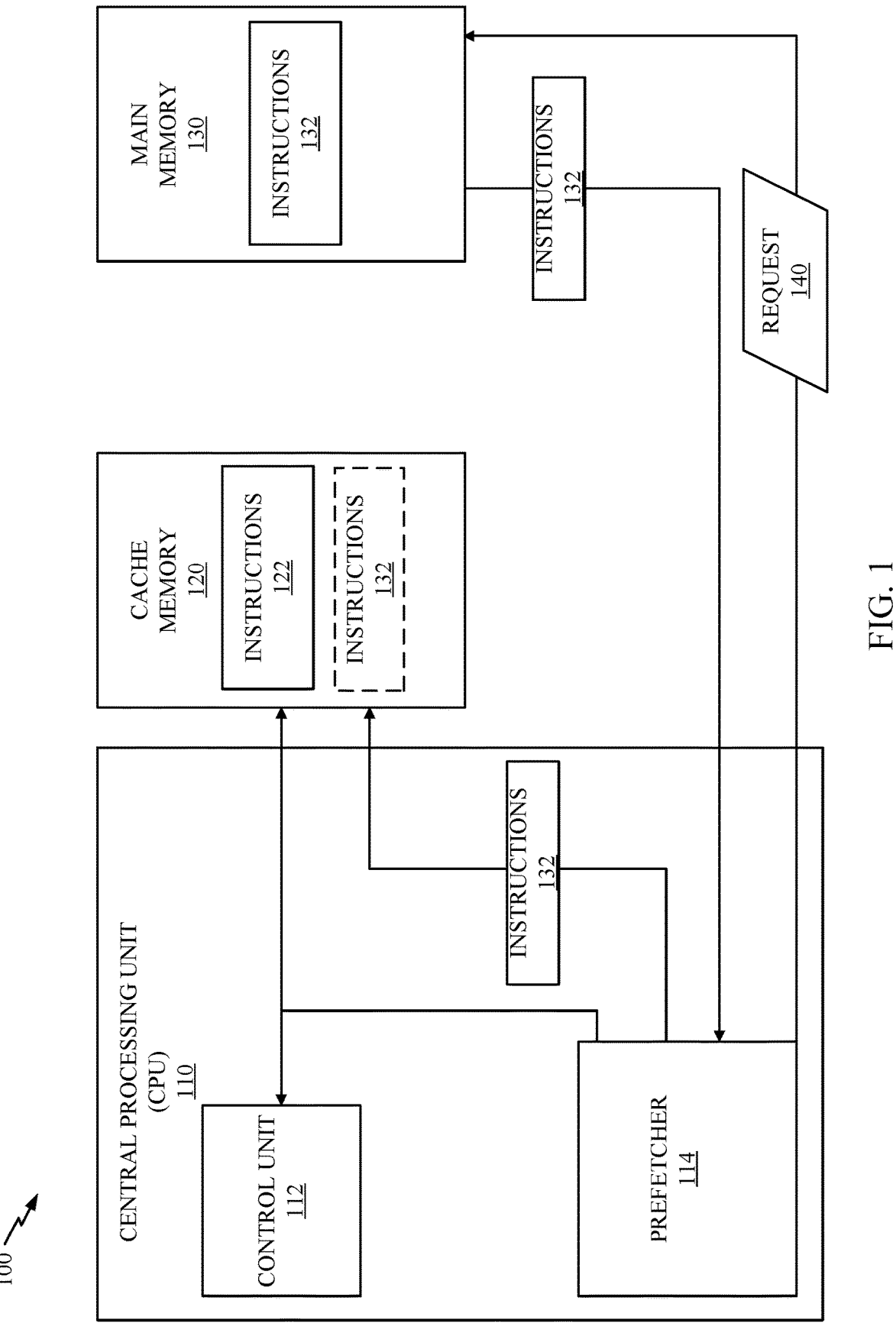
FIG. 1 depicts an example computing environment for prefetching an access pattern associated with an application according to various aspects of the present disclosure.

FIG. 1 illustrates an example computing environment 100 for prefetching according to various aspects of the present disclosure. The computing environment 100 includes a central processing unit (CPU) 110 configured to execute instructions to perform various computing operations. The CPU 110 may include a control unit 112 and a prefetcher 114.

The computing environment 100 includes a cache memory 120 communicatively coupled to the CPU 110. The cache memory 120 may store instructions 122 to be executed by the CPU 110. Although the cache memory 120 is depicted as being separate from the CPU 110, the cache memory 120 may, in some aspects, be included as part of the CPU 110.

The computing environment 100 includes a main memory 130. The main memory 130 is slower than the cache memory 120 and is configured to store instructions 132 to be executed by the CPU 110. In certain aspects, the main memory 130 may include random access memory (RAM).

The prefetcher 114 of the CPU 110 is configured to anticipate data and/or instructions, such as the instructions 132 stored in the main memory 130, that are needed by the CPU 110, such as the control unit 112 thereof, and are not already loaded into the cache memory 120. The prefetcher 114 may be further configured to fetch the instructions 132 from the main memory 130 and load the instructions 132 into the cache memory 120 before the instructions 132 are needed by the CPU 110.

As an example, a prefetch operation performed by the prefetcher 114 may include the prefetcher 114 requesting the instructions 132 from the main memory 130 (e.g., by sending a request 140). The prefetcher operation may include receiving the instructions 132 from the main memory 130 and loading the instructions 132 into the cache memory 120. By fetching the instructions 132 from the main memory 130 and loading the instructions 132 into the cache memory 120 before the instructions 132 are needed by the CPU 110, the prefetcher 114 minimizes an amount of time the CPU 110 has to wait for the instructions 132 thereby improving the performance (e.g., efficiency) of the CPU 110.

In certain aspects, the instructions 132 stored on the main memory 130 may include multiple instructions stored at different memory addresses of the main memory 130. For example, a first instruction for the control unit 112 may be stored at a first memory address of the main memory 130, and a second instruction for the control unit 112 may be stored at a second memory address of the main memory 130. In such aspects, the prefetcher 114 may be configured to perform separate prefetch operations for the first instruction and the second instruction.

As an example, a first prefetch operation performed by the prefetcher 114 may include sending a request to read the data (e.g., first instruction) stored at the first memory address to obtain the first instruction. In this manner, the prefetcher 114 may obtain the first instruction to load into the cache memory 120. Furthermore, a second prefetch operation performed by the prefetcher 114 may include sending a request to read the data (e.g., second instruction) stored at the second memory address to obtain the second instruction. In this manner, the prefetcher 114 may obtain the second instruction to load into the cache memory 120.

Example Pointer Prefetcher

Figure 2:
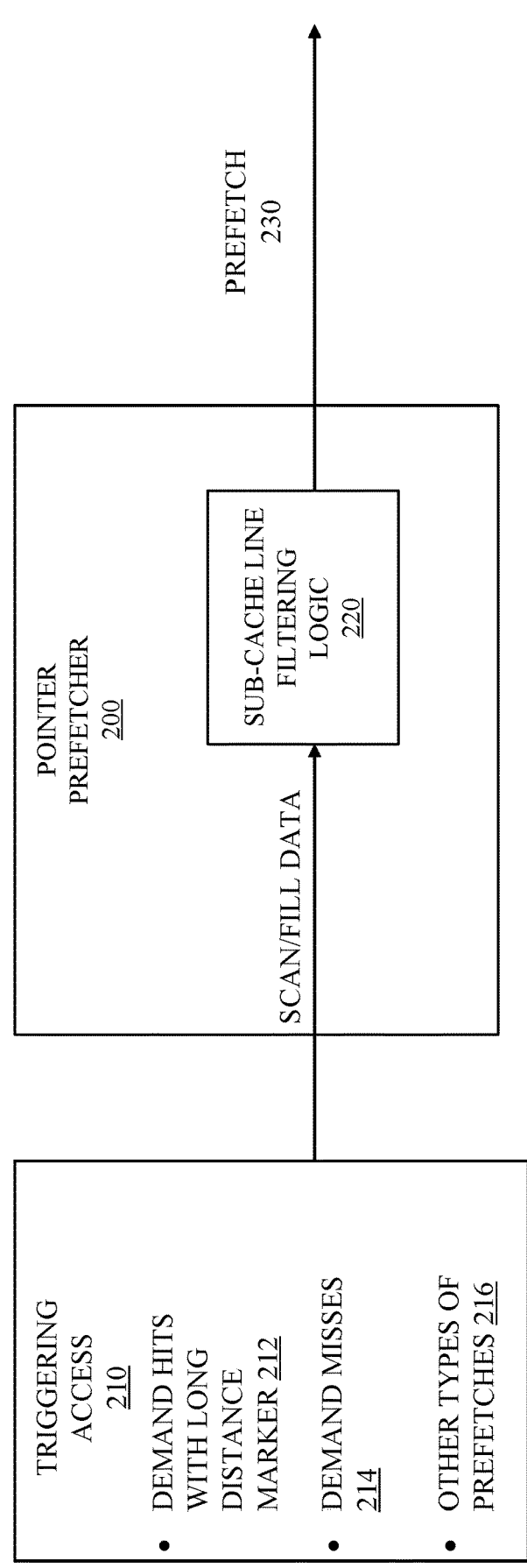
FIG. 2 depicts a pointer prefetcher receiving a triggering access and implementing prefetch logic on the triggering access to perform a prefetch according to various aspects of the present disclosure.

FIG. 2 depict a pointer prefetcher 200 receiving a triggering access 210 that prompts the pointer prefetcher 200 to perform a prefetch 230, in accordance with aspects of the present disclosure. More specifically, the triggering access 210 may cause the pointer prefetcher 200 to scan/fill data associated with the triggering access 210 and may further cause the pointer prefetcher 200 to implement sub-cacheline filtering logic 220 (e.g., discussed in more detail with reference to FIG. 3) on the data to identify information that is needed to perform a prefetch 230. The pointer prefetcher 200 may be implemented in the computing environment 100 discussed above with reference to FIG. 1. More specifically, the pointer prefetcher 200 may be the prefetcher 114 in FIG. 1 or, alternatively, the pointer prefetcher 200 may be included in the computing environment 100 in addition to the prefetcher 114.

In some aspects, the triggering access 210 may be associated with a demand hit 212 (e.g., also known as a cache hit) in cache memory (e.g., the cache memory 120 illustrated in FIG. 1). More specifically, the demand hit 212 may be an instance in which data requested by the CPU (e.g., the CPU 110 illustrated in FIG. 1) is already stored in the cache memory and therefore does not need to be fetched from other memory, such as the main memory 130 illustrated in FIG. 1. In other aspects, the triggering access 210 may be associated with a demand miss 214 (e.g., also known as a cache miss) in cache memory which, in contrast to the demand hit, may be an instance in which the data requested by the CPU is not already stored in the cache memory. In still other aspects, the triggering access may be associated with a prefetch 216 performed by another prefetcher, such as a stride prefetcher.

Example Triggering Access for a Pointer Prefetcher

Figure 3:
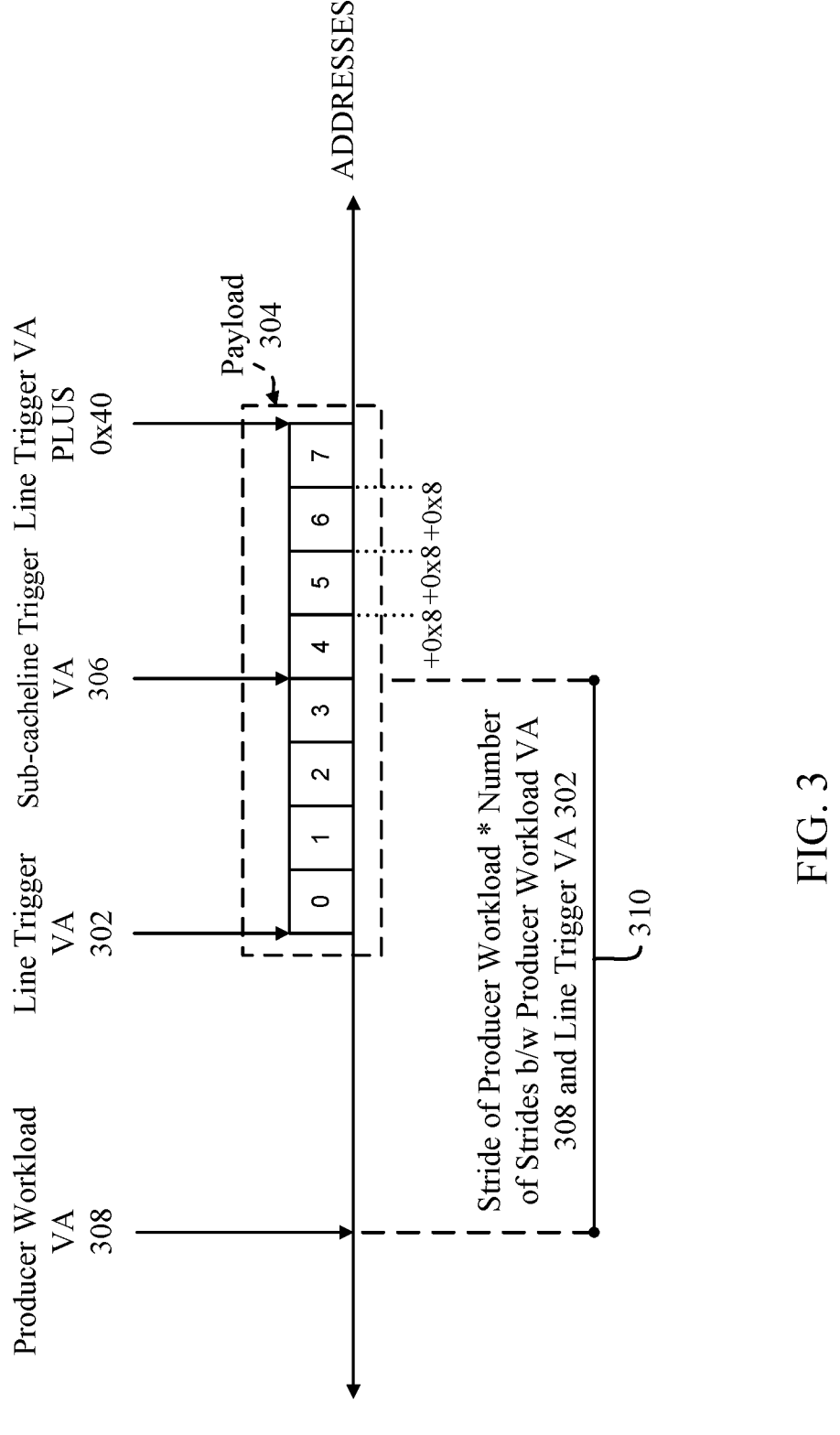
FIG. 3 depicts a triggering access for a pointer prefetcher according to various aspects of the present disclosure.

FIG. 3 depicts an example triggering access 210, in accordance with aspects of the present disclosure. As shown, the triggering access 210 includes data indicative of a line trigger virtual address (VA) 302 that corresponds to a beginning of a payload 304 of a cache line. The payload 304 includes a plurality of blocks of data (e.g., labeled 0-7), with each block of data representing a unit (e.g., a byte) of data. Furthermore, the data associated with one of the blocks (e.g., block 4) may include a consumer workload VA corresponding to a consumer workload (e.g., application) that consumes data produced by a producer workload having a producer workload VA 308.

In some aspects, the triggering access 210 may not include sub-cacheline information. For example, the triggering access 210 may be associated with a prefetch performed by a prefetcher, such as a stride prefetcher, that has cache line granularity. Therefore, since the prefetcher has cache line granularity, data fetched by the prefetcher does not include sub-cacheline information, such as which offsets (e.g., blocks of data) of the payload 304 of the cache line need to be accessed. Thus, pointer prefetchers typically fetch the entire payload 304 of the cache line (that is, every block of data in the payload 304). In most instances, however, this is not needed and results in the cache memory (e.g., cache memory 120 illustrated in FIG. 1) being polluted with useless prefetches that lead to cache misses and reduced performance of the CPU (e.g., the CPU 110 illustrated in FIG. 1).

To improve the accuracy of prefetches performed by a pointer prefetcher, the pointer prefetcher may implement the sub-cacheline filtering logic 220 illustrated in FIG. 2 according to aspects of the present disclosure. More specifically, the sub-cacheline filtering logic 220 may, when executed by the pointer prefetcher, cause the pointer prefetcher to determine a stride associated with a producer workload VA 308.

In some aspects, the producer workload VA 308 may include sub-cacheline information. More specifically, a portion (e.g., six least significant bits) of the producer workload VA 308 may include information (e.g., sub-cacheline information) from which the stride of the producer workload may be determined.

In some aspects, the sub-cacheline filtering logic 220 may, when executed by the pointer prefetcher, cause the pointer prefetcher to determine a number of strides between the producer workload VA 308 and the line trigger VA 302. For example, the following formula may be used to determine the number of strides:

$$\text{Number of Strides} = (\text{Line Trigger VA} - \text{Producer Workload VA})/\text{Stride}$$

In some aspects, the result (that is, the number of strides) of the above formula may be provided as an input to a function (e.g., such as the math.ceil function in MATLAB®) that rounds the result up to the nearest integer. For example, the function may round the result of the above formula up to 4 strides if the result is that there are 3.8 strides between the producer workload VA 308 and the line trigger VA 302.

The sub-cacheline filtering logic 220 may, when executed by the pointer prefetcher, cause the pointer prefetcher to determine a sub-cacheline trigger VA 306. For example, in some aspects, the following formula may be used to determine the sub-cacheline trigger VA 306:

$$\text{Sub-Cacheline trigger VA} = \text{Producer Workload VA} +/- (\text{stride} * \text{number of strides})$$

where the number of strides is multiplied by the stride to obtain a product (e.g., denoted as 310 in FIG. 3) is either added to the producer workload VA 308 or, alternatively, subtracted from the producer workload VA 308.

After determining the sub-cacheline trigger VA 306, the sub-cacheline filtering logic 220 may, when executed by the pointer prefetcher, cause the pointer prefetcher to launch prefetches starting at the sub-cacheline trigger VA 306. For example, the sub-cacheline trigger VA 306 may correspond to an address associated with a block (e.g., block 4 as illustrated in FIG. 3) of the plurality of blocks of data included in the payload 304 of the cache line. Thus, for this example, the pointer prefetcher fetches the data stored at the block (e.g., block 4) and continues fetching the data stored at subsequent blocks within the payload 304 of the cache line and pointed to by the stride associated with the producer workload VA 308.

If, for example, the stride associated with the producer workload VA 308 is 0x8, then the pointer prefetcher may prefetch data stored at every subsequent block (e.g., blocks 5, 6, 7, 8) included in the payload 304 and following the block (e.g., 4) whose address corresponds to the sub-cacheline trigger VA 306. As another example, the pointer prefetcher may fetch data stored at blocks 4 and 6 if the stride associated with the producer workload is 0x16.

In both examples, the accuracy of prefetches performed by the pointer prefetcher is improved compared to prefetches performed by conventional pointer prefetchers because, in contrast to conventional pointer prefetchers, the pointer prefetcher implementing the techniques (e.g., sub-cacheline filtering logic 220) disclosed herein avoid prefetching all the data (e.g., blocks 0, 1, 2, and 3) stored in the payload 304 of the cache line.

In certain aspects, the sub-cacheline trigger VA 306 and the stride associated with the producer workload VA 308 may point to the consumer workload VA. In other aspects, the sub-cacheline trigger VA 306 and the consumer workload VA may be the same. Stated another way, the sub-cacheline trigger VA 306 of the triggering access may be the consumer workload VA.

To improve timeliness of prefetches performed by the pointer prefetcher, the pointer prefetcher may determine a marker associated with the producer workload. For example, the marker may be a number of cache misses occurring between the producer workload VA 308 and the consumer workload VA. As another example, the marker may be a number of execution cycles occurring between a first execution cycle associated with the producer workload producing data and a second execution cycle occurring associated with the consumer workload VA consuming the data produced by the producer workload.

The pointer prefetcher may determine whether the marker satisfies a threshold and can therefore be considered a long distance marker. In some aspects, the pointer prefetcher may determine whether the computed number of cache misses occurring between the producer workload VA 308 and the consumer workload VA exceeds a threshold number of cache misses. If the pointer prefetcher determines the number of computed cache misses exceeds the threshold number of cache misses, then the pointer prefetcher may determine the marker associated with the producer workload is a long distance marker and may therefore launch the prefetches according to the producer workload VA. Conversely, the pointer prefetcher will forego launching the prefetches if the number of computed cache misses does not exceed the threshold number of cache misses. In this manner, the pointer prefetcher may only perform prefetches for producer workloads whose marker is determined to be a long distance marker.

In some aspects, the pointer prefetcher may determine whether the computed number of execution cycles occurring between the first execution cycle associated with the producer workload producing the data and the second execution cycle associated with the consumer workload consuming the data exceeds a threshold number of execution cycles. If the pointer prefetcher determines the number of computed execution cycles exceeds the threshold number of execution cycles, the pointer prefetcher may determine the marker associated with the producer workload is a long distance marker and may therefore launch the prefetches according to the producer workload VA. Conversely, the pointer prefetcher will forego launching the prefetches if the number of computed execution cycles does not exceed the threshold number of execution cycles.

Example Method for Prefetching with a Pointer Prefetcher

FIG. 4 is a diagram depicting an example method 400 for prefetching with a pointer prefetcher, according to various aspects of the present disclosure. For example, method 400 may be performed by the pointer prefetcher 200 of FIG. 2 and/or by a processing system such as processing system 500 of FIG. 5, described below.

Method 400 begins at block 405, with obtaining a triggering access (e.g., the triggering access 210 illustrated in FIG. 2). In some instances, the triggering access may include a line trigger virtual address (e.g., the line trigger VA 302 illustrated in FIG. 3) denoting a beginning of a payload (e.g., the payload 304 illustrated in FIG. 3) of a cache line that includes a sub-cacheline trigger virtual address of triggering access (e.g., the sub-cacheline trigger VA 306 illustrated in FIG. 3). In other aspects, the triggering access may be associated with a prefetch performed by another prefetcher, such as a stride prefetcher.

Method 400 continues at block 410, with determining a stride associated with the producer workload virtual address (e.g., producer workload VA 308 illustrated in FIG. 3) that produces the data consumed by the consumer workload that is associated with the triggering access obtained at block 405. More specifically, the method 400 includes determining the stride based, at least in part, on a virtual address of the producer workload. For instance, a portion of the virtual address of the producer workload may include sub-cacheline information, such as the stride associated with the producer workload VA. For example, the portion of the virtual address of the producer workload may include a select number (e.g., 6) of the least significant bits of the virtual address of the producer workload.

Method 400 continues at block 415, with determining the sub-cacheline trigger virtual address based, at least in part, on the line trigger virtual address of the triggering access, the virtual address of the producer workload, and the stride associated with the producer workload. In some aspects, the sub-cacheline trigger virtual address of the triggering access may be determined using the formulas discussed above with reference to FIG. 3. For example, the number of strides between the virtual address of the producer workload and the line trigger virtual address of the line triggering access. Next, the sub-cacheline trigger virtual address of the triggering access may be determined using the determined stride of the producer workload and the calculated number of strides between the virtual address of the producer workload and the line trigger virtual address of the line trigger access. For example, the stride of the producer workload may be multiplied by the calculated number of strides between the virtual address of the producer workload and the line trigger virtual address of the triggering access, and the product (e.g., denoted by 310 in FIG. 3) of the multiplication may be added to the virtual address of the producer workload or, alternatively, subtracted from the virtual address of the producer workload.

Method 400 continues at block 420, with launching prefetches for data offsets (e.g., blocks of memory) included in the payload cache line that are pointed to according to the stride associated with the producer workload. More specifically, the prefetches may be launched starting at the sub-cacheline trigger virtual address as determined at block 415. In this manner, the pointer prefetcher may avoid prefetching all of the data associated with the cache line. For example, method 400 allows the pointer prefetcher to avoid fetching data stored at virtual addresses located before the virtual address of the consumer workload within the cache line.

In some aspects, launching the prefetches may include determining a marker associated with the producer workload. For example, the marker may be a number of cache misses occurring between the virtual address of the producer workload and the virtual address of the consumer workload. As another example, the marker may be a number of execution cycles occurring between a first execution cycle associated with the producer workload producing data and a second execution cycle occurring associated with the consumer workload consuming the data produced by the producer workload.

The disclosed techniques provide improved pointer prefetchers. For instance, by determining the stride of the producer workload and the virtual address of the consumer workload, the accuracy of pointer prefetchers may be improved, because pointer prefetchers may begin launching prefetches at the sub-cacheline trigger virtual address of the triggering access and may perform subsequent prefetches according to the determined stride. In this manner, pointer prefetchers implementing the disclosed techniques may avoid fetching the entire payload of a cache line and polluting cache memory with useless prefetches that lead to cache misses and therefore diminished performance of the CPU. Furthermore, by determining whether the marker associated with the producer workload is a long distance marker, the timeliness of prefetches performed by pointer prefetchers may be improved. For instance, the marker may indicate whether a pointer prefetcher does or does not have sufficient time to perform the prefetch and may therefore reduce cache misses as pointer prefetchers will be less likely to perform prefetches that will not be completed in time.

Example Processing System for Prefetching

Figure 5:
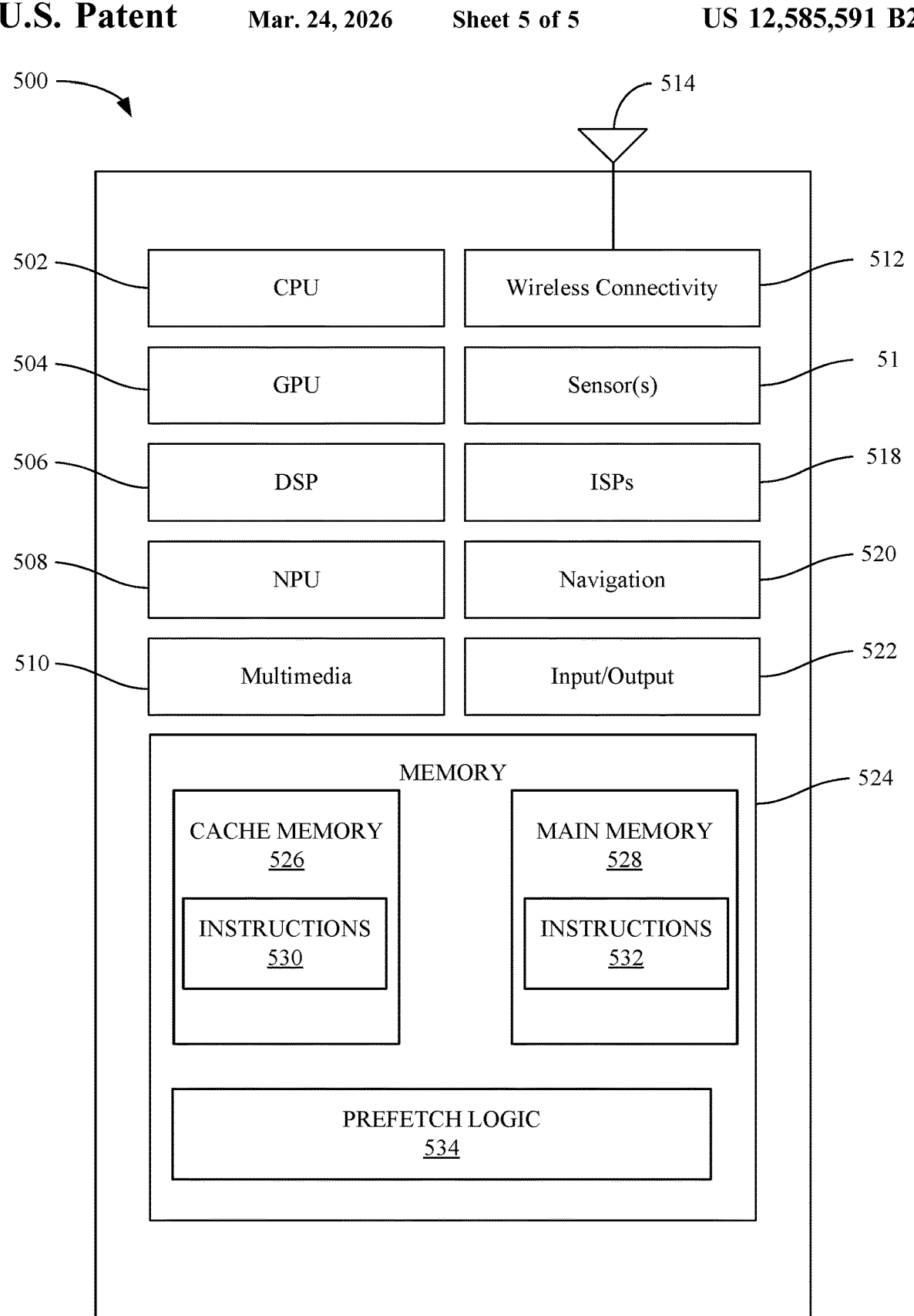
FIG. 5 depicts an example processing system configured to perform various aspects of the present disclosure.

In some aspects, the techniques and methods described with reference to FIGS. 2-4 may be implemented on one or more devices or systems. FIG. 5 depicts an example processing system 500 configured to perform various aspects of the present disclosure, including, for example, the techniques and methods described with respect to FIGS. 2-4. In some aspects, the processing system 500 may correspond to the computing environment 100 of FIG. 1. Although depicted as a single system for conceptual clarity, in some aspects, as discussed above, the operations described below with respect to the processing system 500 may be distributed across any number of devices or systems.

The processing system 500 includes a central processing unit (CPU) 502 (e.g., corresponding to CPU 110 of FIG. 1). Instructions executed at the CPU 502 may be loaded, for example, from a cache memory (e.g., corresponding to the cache memory 120 of FIG. 1) associated with the CPU 502.

The processing system 500 also includes additional processing components tailored to specific functions, such as a graphics processing unit (GPU) 504, a digital signal processor (DSP) 506, a neural processing unit (NPU) 508, a multimedia component 510 (e.g., a multimedia processing unit), and a wireless connectivity component 512.

An NPU, such as NPU 508, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 508, are configured to accelerate the performance of common machine learning tasks, such as image classification, machine translation, object detection, and various other predictive models. In some examples, a plurality of NPUs may be instantiated on a single chip, such as a SoC, while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference).

In some implementations, the NPU 508 is a part of one or more of the CPU 502, the GPU 504, and/or the DSP 506.

In some examples, the wireless connectivity component 512 may include subcomponents, for example, for third generation (3G) connectivity, fourth generation (4G) connectivity (e.g., 4G Long-Term Evolution (LTE)), fifth generation connectivity (e.g., 5G or New Radio (NR)), Wi-Fi connectivity, Bluetooth connectivity, and/or other wireless data transmission standards. The wireless connectivity component 512 is further coupled to one or more antennas 514.

The processing system 500 may also include one or more sensor processing units 516 associated with any manner of sensor, one or more image signal processors (ISPs) 518 associated with any manner of image sensor, and/or a navigation processor 520, which may include satellite-based positioning system components (e.g., GPS or GLONASS), as well as inertial positioning system components.

The processing system 500 may also include one or more input and/or output devices 522, such as screens, touch-sensitive surfaces (including touch-sensitive displays), physical buttons, speakers, microphones, and the like.

In some examples, one or more of the processors of the processing system 500 may be based on an ARM or RISC-V instruction set.

The processing system 500 also includes the memory 524, which is representative of one or more static and/or dynamic memories, such as a dynamic random access memory, a flash-based static memory, and the like. In this example, the memory 524 includes computer-executable components, which may be executed by one or more of the aforementioned processors of the processing system 500.

The memory 524 may include cache memory 526 (e.g., corresponding to the cache memory 120 illustrated in FIG. 1). The memory 524 may also include main memory 528 (e.g., corresponding to the main memory 130 illustrated in FIG. 1). The cache memory 526 may include instructions 530 to be executed by the CPU 502. The main memory 528 also includes instructions 532 to be executed by the CPU 502. As discussed previously, a prefetcher (e.g, the prefetcher 114 illustrated in FIG. 1) may anticipate that the CPU 502 needs instructions 532 from the main memory 528 and fetch the instructions 532 from the main memory 528 and load the instructions 532 into the cache memory 526 before the instructions 532 are requested by the CPU 502.

Generally, the processing system 500 and/or components thereof may be configured to perform the methods described herein. For example, the memory 524 may include sub-cacheline filtering logic 534, such as the sub-cacheline filtering logic 220 of FIG. 2, needed to perform the disclosed techniques, such as the method of FIG. 4, to improve the timeliness and/or accuracy of prefetches performed by a pointer prefetcher.

Notably, in other aspects, elements of the processing system 500 may be omitted, such as where the processing system 500 is a server computer or the like. For example, the multimedia component 510, the wireless connectivity component 512, the sensor processing units 516, the ISPs 518, and/or the navigation processor 520 may be omitted in other aspects. Further, aspects of the processing system 500 may be distributed between multiple devices.

EXAMPLE CLAUSES

Implementation examples are described in the following numbered clauses:

Clause 1: A method for prefetching with a pointer prefetcher, the method comprising: obtaining a triggering access comprising a virtual address denoting a beginning of a payload of a cache line, the payload including a line trigger virtual address of a consumer workload that consumes data produced by a producer workload; determining a stride associated with the producer workload based, at least in part, on a virtual address of the producer workload; determining a sub-cacheline trigger virtual address of the triggering access based, at least in part, on the line trigger virtual address of the triggering access, the virtual address of the producer workload, and the stride associated with the producer workload; and launching, starting at the virtual address of the consumer workload, prefetches for data offsets within the cache line and pointed to by the stride associated with the producer workload.

Clause 2: The method of Clause 1, wherein the launching comprises: determining a marker associated with the triggering access based, at least in part, on a virtual address of the producer workload and the virtual address of the consumer workload; determining the marker satisfies a threshold; and in response to determining the marker satisfies the threshold, launching the prefetches for the data offsets.

Clause 3: The method of Clause 2, wherein: determining the marker comprises determining a number of cache misses between the virtual address of the producer workload and the virtual address of the consumer workload; and determining the marker satisfies the threshold comprises determining the number of cache misses exceeds a threshold number of cache misses.

Clause 4: The method of Clause 2 or 3, wherein: determining the marker comprises determining a number of execution cycles occurring between a first execution cycle associated with the producer workload producing the data and a second execution cycle associated with the consumer workload consuming the data produced by the producer workload; and determining the marker satisfies the threshold comprises determining the number of execution cycles occurring between the first execution cycle and the second execution cycle exceeds a threshold number of execution cycles.

Clause 5: The method of any one of Clause 1-4, wherein determining the sub-cacheline trigger virtual address of the triggering comprises: determining a number of strides between the virtual address of the producer workload and the line trigger virtual address denoting the beginning of the payload of the cache line; multiplying the number of strides by the stride associated with the producer workload; and adding a result of the multiplying to the virtual address of the producer workload to obtain the sub-cacheline trigger virtual address of the triggering access.

Clause 6: The method of Clause 5, wherein determining the number of strides comprises: subtracting the virtual address of the producer workload from the line trigger virtual address denoting the beginning of the payload of the cache line to obtain a delta between the virtual address of the producer workload and the line trigger virtual address denoting the beginning of the payload; and dividing the delta by the stride associated with the producer workload to determine the number of strides.

Clause 7: The method of Clause 6, wherein determining the number of strides further comprises: rounding the determined number of strides up to a nearest integer.

Clause 8: The method of any one of Clause 1-7, wherein the triggering access is a cache hit associated with a prefetch launched by a prefetcher other than the pointer prefetcher.

Clause 9: The method of Clause 8, wherein the prefetcher other than the pointer prefetcher is a stride prefetcher.

Clause 10: The method of any of Clause 1-9, wherein a portion of the virtual address of the producer workload includes sub-cacheline information indicative of the stride of the producer workload.

Clause 11: The method of Clause 10, wherein the portion of the virtual address of the producer workload includes the six least significant bits in the virtual address of the producer workload.

Clause 12: A processor comprising: a pointer prefetcher configured to execute computer-executable instructions to cause the pointer prefetcher to: obtain a triggering access comprising a line trigger virtual address denoting a beginning of a payload of a cache line, the payload including a virtual address of a consumer workload that consumes data produced by a producer workload; determine a stride associated with the producer workload based, at least in part, on a virtual address of the producer workload; determine a sub-cacheline trigger virtual address of the triggering access based, at least in part, on the line trigger virtual address of the triggering access, the virtual address of the producer workload, and the stride associated with the producer workload; and launch, starting at the sub-cacheline trigger virtual address of the triggering access, prefetches for data offsets within the cache line and pointed to by the stride associated with the producer workload.

Clause 13: The processor of Clause 12, wherein to launch the prefetches, the pointer prefetcher is configured to: determine a marker associated with the triggering access based, at least in part, on a virtual address of the producer workload and the virtual address of the consumer workload; determine the marker satisfies a threshold; and in response to determining the marker satisfies the threshold, launch the prefetches for the data offsets.

Clause 14: The processor of Clause 13, wherein to determine the marker, the pointer prefetcher is configured to determine a number of cache misses between the virtual address of the producer workload and the virtual address of the consumer workload; and to determine the marker satisfies the threshold, the pointer prefetcher is configured to determine the number of cache misses exceeds a threshold number of cache misses.

Clause 15: The processor of Clause 13, wherein to determine the marker, the pointer prefetcher is configured to determine a number of execution cycles occurring between a first execution cycle associated with the producer workload producing the data and a second execution cycle associated with the consumer workload consuming the data produced by the producer workload; and to determine the marker satisfies the threshold, the pointer prefetcher is configured to determine the marker satisfies the threshold comprises determining the number of execution cycles occurring between the first execution cycle and the second execution cycle exceeds a threshold number of execution cycles.

Clause 16: The processor of any one of Clause 12 to 15, wherein to determine the sub-cacheline trigger virtual address of the triggering access, the pointer prefetcher is configured to: determine a number of strides between the virtual address of the producer workload and the line trigger virtual address denoting the beginning of the payload of the cache line; multiply the number of strides by the stride associated with the producer workload; and add a result of the multiplying to the virtual address of the producer workload to obtain the sub-cacheline trigger virtual address of the triggering access.

Clause 17: The processor of Clause 16, wherein to determine the number of strides, the pointer prefetcher is configured to: subtract the virtual address of the producer workload from the line trigger virtual address denoting the beginning of the payload of the cache line to obtain a delta between the virtual address of the producer workload and the virtual address denoting the beginning of the payload; and divide the delta by the stride associated with the producer workload to determine the number of strides.

Clause 18: The processor of Clause 17, wherein to determine the number of strides, the pointer prefetcher is further configured to: round the determined number of strides up to a nearest integer.

Clause 19: The processor of Clause 18, wherein the triggering access is a cache hit associated with a prefetch launched by a prefetcher other than the pointer prefetcher.

Clause 20: An apparatus comprising: means for obtaining a triggering access comprising a line trigger virtual address denoting a beginning of a payload of a cache line, the payload including a virtual address of a consumer workload that consumes data produced by a producer workload; means for determining a stride associated with the producer workload based, at least in part, on a virtual address of the producer workload; means for determining a sub-cacheline trigger virtual address of the triggering access based, at least in part, on the line trigger virtual address of the triggering access, the virtual address of the producer workload, and the stride associated with the producer workload; and means for launching, starting at the sub-cacheline trigger virtual address of the triggering access, prefetches for data offsets within the cache line and pointed to by the stride associated with the producer workload.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

For example, means for obtaining a triggering access comprising a line trigger virtual address denoting a beginning of a payload of a cache line may include a pointer prefetcher (e.g., pointer prefetcher 200 as illustrated in FIG. 2). Means for determining a stride associated with the producer workload based, at least in part, on a virtual address of the producer workload may include the pointer prefetcher. Means for determining a sub-cacheline trigger virtual address of the triggering access based, at least in part, on the line trigger virtual address of the triggering access, the virtual address of the producer workload, and the stride associated with the producer workload may include the pointer prefetcher. Means for launching, starting at the sub-cacheline trigger virtual address of the triggering access, prefetches for data offsets within the cache line and pointed to by the stride associated with the producer workload may include the pointer prefetcher.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for prefetching with a pointer prefetcher, the method comprising:

obtaining a triggering access comprising a line trigger virtual address denoting a beginning of a payload of a cache line, the payload including a virtual address of a consumer workload that consumes data produced by a producer workload;

determining a stride associated with the producer workload based, at least in part, on a virtual address of the producer workload;

determining a sub-cacheline trigger virtual address of the triggering access based, at least in part, on the line trigger virtual address of the triggering access, the virtual address of the producer workload, and the stride associated with the producer workload; and launching, starting at the sub-cacheline trigger virtual address of the triggering access, prefetches for data offsets within the cache line and pointed to by the stride associated with the producer workload, wherein the launching comprises:

determining a marker associated with the triggering access based, at least in part, on a virtual address of the producer workload and the virtual address of the consumer workload;

determining the marker satisfies a threshold; and in response to determining the marker satisfies the threshold, launching the prefetches for the data offsets.

2. The method of claim 1, wherein:

determining the marker comprises determining a number of cache misses between the virtual address of the producer workload and the virtual address of the consumer workload; and determining the marker satisfies the threshold comprises determining the number of cache misses exceeds a threshold number of cache misses.

3. The method of claim 1, wherein:

determining the marker comprises determining a number of execution cycles occurring between a first execution cycle associated with the producer workload producing the data and a second execution cycle associated with the consumer workload consuming the data produced by the producer workload; and determining the marker satisfies the threshold comprises determining the number of execution cycles occurring between the first execution cycle and the second execution cycle exceeds a threshold number of execution cycles.

4. The method of claim 1, wherein determining the sub-cacheline trigger virtual address of the triggering access comprises:

determining a number of strides between the virtual address of the producer workload and the line trigger virtual address denoting the beginning of the payload of the cache line;

multiplying the number of strides by the stride associated with the producer workload; and adding a result of the multiplying to the virtual address of the producer workload to obtain the sub-cacheline trigger virtual address of the triggering access.

5. The method of claim 4, wherein determining the number of strides comprises:

subtracting the virtual address of the producer workload from the line trigger virtual address denoting the beginning of the payload of the cache line to obtain a delta between the virtual address of the producer workload and the line trigger virtual address denoting the beginning of the payload; and dividing the delta by the stride associated with the producer workload to determine the number of strides.

6. The method of claim 5, wherein determining the number of strides further comprises:

rounding the determined number of strides up to a nearest integer.

7. The method of claim 1, wherein the triggering access is a cache hit associated with a prefetch launched by a prefetcher other than the pointer prefetcher.

8. The method of claim 7, wherein the prefetcher other than the pointer prefetcher is a stride prefetcher.

9. The method of claim 1, wherein a portion of the virtual address of the producer workload includes sub-cacheline information indicative of the stride of the producer workload.

10. The method of claim 9, wherein the portion of the virtual address of the producer workload includes the six least significant bits in the virtual address of the producer workload.

11. A processor comprising:

a pointer prefetcher configured to execute computer-executable instructions to cause the pointer prefetcher to:

obtain a triggering access comprising a line trigger virtual address denoting a beginning of a payload of a cache line, the payload including a virtual address of a consumer workload that consumes data produced by a producer workload;

determine a stride associated with the producer workload based, at least in part, on a virtual address of the producer workload;

determine a sub-cacheline trigger virtual address of the triggering access based, at least in part, on the line trigger virtual address of the triggering access, the virtual address of the producer workload, and the stride associated with the producer workload; and launch, starting at the sub-cacheline trigger virtual address of the triggering access, prefetches for data offsets within the cache line and pointed to by the stride associated with the producer workload, wherein to launch the prefetches the pointer prefetcher is configured to:

determine a marker associated with the triggering access based, at least in part, on a virtual address of the producer workload and the virtual address of the consumer workload;

determine the marker satisfies a threshold; and in response to determining the marker satisfies the threshold, launch the prefetches for the data offsets.

12. The processor of claim 2, wherein:

to determine the marker, the pointer prefetcher is configured to determine a number of cache misses between the virtual address of the producer workload and the virtual address of the consumer workload; and to determine the marker satisfies the threshold, the pointer prefetcher is configured to determine the number of cache misses exceeds a threshold number of cache misses.

13. The processor of claim 11, wherein:

to determine the marker, the pointer prefetcher is configured to determine a number of execution cycles occurring between a first execution cycle associated with the producer workload producing the data and a second execution cycle associated with the consumer workload consuming the data produced by the producer workload; and to determine the marker satisfies the threshold, the pointer prefetcher is configured to determine the marker satisfies the threshold comprises determining the number of execution cycles occurring between the first execution cycle and the second execution cycle exceeds a threshold number of execution cycles.

14. The processor of claim 11, wherein to determine the virtual address of the consumer workload, the pointer prefetcher is configured to:

determine a number of strides between the virtual address of the producer workload and the line trigger virtual address denoting the beginning of the payload of the cache line;

multiply the number of strides by the stride associated with the producer workload; and add a result of the multiplying to the virtual address of the producer workload to obtain the sub-cacheline trigger virtual address of the triggering access.

15. The processor of claim 14, wherein to determine the number of strides, the pointer prefetcher is configured to:

subtract the virtual address of the producer workload from the line trigger virtual address denoting the beginning of the payload of the cache line to obtain a delta between the virtual address of the producer workload and the virtual address denoting the beginning of the payload; and divide the delta by the stride associated with the producer workload to determine the number of strides.

16. The processor of claim 15, wherein to determine the number of strides, the pointer prefetcher is further configured to:

round the determined number of strides up to a nearest integer.

17. The processor of claim 16, wherein the triggering access is a cache hit associated with a prefetch launched by a prefetcher other than the pointer prefetcher.

18. An apparatus comprising:

means for obtaining a triggering access comprising a line trigger virtual address denoting a beginning of a payload of a cache line, the payload including a virtual address of a consumer workload that consumes data produced by a producer workload;

means for determining a stride associated with the producer workload based, at least in part, on a virtual address of the producer workload;

means for determining a sub-cacheline trigger virtual address of the triggering access based, at least in part, on the line trigger virtual address of the triggering access, the virtual address of the producer workload, and the stride associated with the producer workload; and means for launching, starting at the sub-cacheline trigger virtual address of the triggering access, prefetches for data offsets within the cache line and pointed to by the stride associated with the producer workload, wherein the means for launching the prefetches comprises:

means determining a marker associated with the triggering access based, at least in part, on a virtual address of the producer workload and the virtual address of the consumer workload;

means determining the marker satisfies a threshold; and in response to determining the marker satisfies the threshold, means launching the prefetches for the data offsets.

* * * * *